US012750398B2

(12) United States Patent
Doron et al.

(10) Patent No.: US 12,750,398 B2
(45) Date of Patent: Sep. 29, 2026

(54) TECHNIQUES FOR DETECTING ADVANCED APPLICATION LAYER FLOOD ATTACK TOOLS

(71) Applicant: Radware Ltd., Tel Aviv (IL)

(72) Inventors: Ehud Doron, Moddi'in (IL); Alon Tamir, Kiryat Ono (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 196 days.

(21) Appl. No.: 18/058,482

(22) Filed: Nov. 23, 2022

(65) Prior Publication Data

US 2024/0171607 A1 May 23, 2024

(51) Int. Cl.
*H04L 9/40* (2022.01)

(52) U.S. Cl.
CPC ...... *H04L 63/1458* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,200,105 | B1 | 4/2007 | Milliken et al. |
| 8,122,253 | B2 | 2/2012 | Garg et al. |
| 8,171,553 | B2 | 5/2012 | Aziz et al. |
| 8,375,444 | B2 | 2/2013 | Aziz et al. |
| 8,434,140 | B2 | 4/2013 | Shi |

(Continued)

FOREIGN PATENT DOCUMENTS

| | | | |
|---|---|---|---|
| CN | 101478540 | B | 4/2012 |
| CN | 103701816 | B | 7/2017 |

(Continued)

OTHER PUBLICATIONS

International Search Report for PCT Application No. PCT/IB2022/061335 dated Mar. 8, 2023. The International Bureau of WIPO.

(Continued)

*Primary Examiner* — Scott B Christensen
(74) *Attorney, Agent, or Firm* — M&B IP Analysts, LLC

(57) ABSTRACT

A method and system for detecting application layer flood denial-of-service (DDoS) attacks carried by attackers utilizing advanced application layer flood attack tools are provided. The method processing application-layer transactions received during a current time window to detect a rate-based anomaly in a traffic directed to a protected entity; processing the received application-layer transactions to determine rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent the applicative behavior of the protected entity modeled based on the application-layer transactions; determining based on a detected rate-based anomaly and a detected rate-invariant anomaly if an application layer flood DDoS is present in the current time window; and causing a mitigation action when the application layer flood DDoS is present.

39 Claims, 11 Drawing Sheets

(56) References Cited

U.S. PATENT DOCUMENTS

| | | | |
|---|---|---|---|
| 8,474,044 | B2 | 6/2013 | Zawadowskiy et al. |
| 8,528,086 | B1 | 9/2013 | Aziz |
| 8,549,638 | B2 | 10/2013 | Aziz |
| 8,584,239 | B2 | 11/2013 | Aziz et al. |
| 8,635,696 | B1 | 1/2014 | Aziz |
| 8,776,229 | B1 | 7/2014 | Aziz |
| 8,844,034 | B2 | 9/2014 | Lin |
| 8,881,282 | B1 | 11/2014 | Aziz et al. |
| 8,984,638 | B1 | 3/2015 | Aziz et al. |
| 9,838,416 | B1 | 12/2017 | Aziz |
| 9,871,810 | B1 | 1/2018 | Miskovic |
| 9,985,982 | B1 | 5/2018 | Bartos et al. |
| 10,009,373 | B2 | 6/2018 | Jain |
| 10,178,109 | B1 | 1/2019 | Miskovic |
| 10,218,725 | B2 | 2/2019 | Kim |
| 10,284,574 | B1 | 5/2019 | Aziz et al. |
| 10,367,677 | B2 | 7/2019 | Parkvall et al. |
| 10,630,410 | B2 | 4/2020 | Parkvall et al. |
| 10,728,268 | B1 | 7/2020 | Hagen et al. |
| 10,880,270 | B1 | 12/2020 | Rigor et al. |
| 11,082,435 | B1 | 8/2021 | Aziz et al. |
| 11,153,217 | B1 | 10/2021 | Singh et al. |
| 11,251,975 | B1 | 2/2022 | Wahla et al. |
| 11,379,498 | B2 | 7/2022 | Gandhi et al. |
| 11,516,232 | B1 | 11/2022 | Sumpter et al. |
| 11,652,562 | B2 | 5/2023 | Parkvall et al. |
| 11,757,914 | B1 | 9/2023 | Jakobsson et al. |
| 2003/0145232 | A1 | 7/2003 | Poletto et al. |
| 2004/0215976 | A1 | 10/2004 | Jain |
| 2004/0250124 | A1 | 12/2004 | Chesla et al. |
| 2005/0265233 | A1 | 12/2005 | Johnson et al. |
| 2006/0242701 | A1 | 10/2006 | Black et al. |
| 2007/0250930 | A1 | 10/2007 | Aziz et al. |
| 2008/0005782 | A1 | 1/2008 | Aziz |
| 2008/0052774 | A1 | 2/2008 | Chesla et al. |
| 2008/0086434 | A1 | 4/2008 | Chesla |
| 2008/0086435 | A1 | 4/2008 | Chesla |
| 2009/0138592 | A1 | 5/2009 | Overcash et al. |
| 2010/0175132 | A1 | 7/2010 | Zawadowskiy et al. |
| 2011/0035795 | A1 | 2/2011 | Shi |
| 2011/0093951 | A1 | 4/2011 | Aziz |
| 2011/0099633 | A1 | 4/2011 | Aziz |
| 2012/0317306 | A1 | 12/2012 | Radinsky et al. |
| 2012/0331553 | A1 | 12/2012 | Aziz et al. |
| 2013/0042319 | A1 | 2/2013 | Lin |
| 2017/0134401 | A1 | 5/2017 | Medvedovsky et al. |
| 2017/0331577 | A1 | 11/2017 | Parkvall et al. |
| 2017/0331670 | A1 | 11/2017 | Parkvall et al. |
| 2017/0346932 | A1 | 11/2017 | Hildebrand |
| 2018/0026994 | A1 | 1/2018 | Han et al. |
| 2018/0091548 | A1 | 3/2018 | Jain |
| 2018/0109495 | A1 | 4/2018 | Vasseur et al. |
| 2018/0191773 | A1 | 7/2018 | O'Connell et al. |
| 2019/0020671 | A1 | 1/2019 | Komárek et al. |
| 2019/0158533 | A1 | 5/2019 | Holloway et al. |
| 2019/0207973 | A1 | 7/2019 | Peng |
| 2019/0238424 | A1* | 8/2019 | Guan .................. G06F 16/2379 |
| 2019/0245875 | A1 | 8/2019 | Chen et al. |
| 2019/0354629 | A1 | 11/2019 | Zavesky et al. |
| 2020/0067946 | A1 | 2/2020 | Han et al. |
| 2020/0112571 | A1 | 4/2020 | Koral et al. |
| 2020/0120482 | A1 | 4/2020 | Parkvall et al. |
| 2020/0175161 | A1 | 6/2020 | Giaconi |
| 2020/0285737 | A1 | 9/2020 | Kraus et al. |
| 2020/0314126 | A1 | 10/2020 | Schmugar et al. |
| 2020/0364295 | A1 | 11/2020 | Nigam et al. |
| 2020/0412750 | A1 | 12/2020 | Doron et al. |
| 2021/0021610 | A1 | 1/2021 | Ahire et al. |
| 2021/0092158 | A1 | 3/2021 | Zhao et al. |
| 2021/0099482 | A1 | 4/2021 | Doron et al. |
| 2021/0194903 | A1* | 6/2021 | Medvedovsky .... H04L 63/1416 |
| 2021/0243210 | A1 | 8/2021 | Bernardi et al. |
| 2021/0273865 | A1 | 9/2021 | Jing et al. |
| 2021/0279248 | A1 | 9/2021 | Gandhi et al. |
| 2021/0279354 | A1 | 9/2021 | Gandhi et al. |
| 2022/0019901 | A1 | 1/2022 | Saleh et al. |
| 2022/0027348 | A1 | 1/2022 | Manevich et al. |
| 2022/0027803 | A1 | 1/2022 | Irazabal et al. |
| 2022/0086179 | A1 | 3/2022 | Levin et al. |
| 2022/0103453 | A1 | 3/2022 | Novotny et al. |
| 2022/0150073 | A1 | 5/2022 | Androulaki et al. |
| 2022/0294814 | A1 | 9/2022 | Doron et al. |
| 2022/0318259 | A1 | 10/2022 | Gandhi et al. |
| 2023/0109947 | A1 | 4/2023 | Parkvall et al. |
| 2023/0156034 | A1 | 5/2023 | Naidoo |
| 2023/0231871 | A1 | 7/2023 | Jiao |
| 2024/0106861 | A1 | 3/2024 | Ahn et al. |

FOREIGN PATENT DOCUMENTS

| | | |
|---|---|---|
| CN | 109450721 | 3/2019 |
| CN | 111931175 A | 11/2020 |

OTHER PUBLICATIONS

Written Opinion of the International Searching Authority for PCT Application No. PCT/IB2022/061335 dated Mar. 5, 2023. The International Bureau of WIPO.

International Search Report and Written Opinion of International Searching Authority for PCT/IB2021/060895, ISA/IL, Jerusalem, Israel Dated: Jan. 27, 2022.

International Search Report and Written Opinion of International Searching Authority for PCT/IB2021/060896, ISA/IL, Jerusalem, Israel Dated: Feb. 7, 2022.

Krishtal, Vadim. "How NGINX App Protect Denial of Service Adapts to the Evolving Attack Landscape" Jul. 6, 2021. https://www.nginx.com/blog/how-nginx-app-protect-denial-of-service-adapts-to-evolving-attack-landscape/.

Li, Ke, et al. "Distinguishing DDOS attacks from flash crowds using probability metrics." 2009 third international conference on network and system security. IEEE, 2009.

Sazman, Yaniv. "NGINX App Protect Denial of Service Blocks Application-Level DOS Attacks" Jul. 6, 2021. https://www.nginx.com/blog/NGINX-App-Protect-Denial-of-Service-blocks-application-level-DoS-attacks?mkt_tok=NjUzLVNNQy03ODMAAAF-GuCcl8eRU2sbIGnyNYIK5mqWIY-eqtUsAziVy_1-QlhuEOn1lq_vNc5uSusXhRAzmMjn24X_2QdGCqWsfrAUZWn3cklsLXj2Zn_sOCUhQFtkwRY#Challenge_Collapsar_(CC)_attack.

Singh, Jagdeep, Navjot Jyoti, and Sunny Behal. "On the use of information theory metrics for detecting DDOS attacks and flash events: an empirical analysis, comparison, and future directions." Kuwait Journal of Science 48.4 (2021).

Extended European Search Report for EP application No. 22966422.2, dated Jul. 9, 2026. European Patent Office, Munich, Germany.

* cited by examiner

| 510-1 | 510-2 | 510-3 | 510-4 | 510-5 |
|---|---|---|---|---|
| Attribute Key Value<br><br>_ga | Attribute Key Value<br><br>_gl | Attribute Key Value<br><br>Page | Attribute Key Value | Attribute Key Value |
| OCC<br><br>0 | OCC<br><br>0 | OCC<br><br>0 | OCC<br><br>0 | OCC<br><br>0 |
| Weight<br><br>0 | Weight<br><br>0 | Weight<br><br>0 | Weight<br><br>0 | Weight<br><br>0 |
| Age<br><br>0 | Age<br><br>0 | Age<br><br>0 | Age<br><br>0 | Age<br><br>0 |

FIG. 5A

| 510-1 | 510-2 | 510-3 | 510-4 | 510-5 |
|---|---|---|---|---|
| Attribute Key Value<br><br>_ga | Attribute Key Value<br><br>_gl | Attribute Key Value<br><br>Page | Attribute Key Value | Attribute Key Value<br><br>0 |
| OCC<br><br>**1** | OCC<br><br>**1** | OCC<br><br>0 | OCC<br><br>0 | OCC<br><br>0 |
| Weight<br><br>**½** | Weight<br><br>**½** | Weight<br><br>0 | Weight<br><br>0 | Weight<br><br>0 |
| Age<br><br>t1 | Age<br><br>t1 | Age<br><br>0 | Age<br><br>0 | Age<br><br>0 |

FIG. 5B

| 510-1 | 510-2 | 510-3 | 510-4 | 510-5 |
|---|---|---|---|---|
| Attribute Key Value<br><br>_ga | Attribute Key Value<br><br>_gl | Attribute Key Value<br><br>Page | Attribute Key Value<br><br>location | Attribute Key Value<br><br>0 |
| OCC<br><br>1 | OCC<br><br>1 | OCC<br><br>0 | OCC<br><br>**1** | OCC<br><br>0 |
| Weight<br><br>**1/3** | Weight<br><br>**1/3** | Weight<br><br>0 | Weight<br><br>**1/3** | Weight<br><br>0 |
| Age<br><br>t2 | Age<br><br>t2 | Age<br><br>0 | Age<br><br>t2 | Age<br><br>0 |

FIG. 5C

TECHNIQUES FOR DETECTING ADVANCED APPLICATION LAYER FLOOD ATTACK TOOLS

TECHNICAL FIELD

This present disclosure generally relates to techniques for detection of application-layer denial of service (DoS) based attacks.

BACKGROUND

These days, online businesses and organizations are vulnerable to malicious attacks. Recently, cyber-attacks have been committed using a wide arsenal of attack techniques and tools targeting both the information maintained by online businesses, their IT infrastructure, and the actual service availability. Hackers and attackers are constantly trying to improve their attack strategies to cause irrecoverable damage, overcome currently deployed protection mechanisms, and so on.

One type of popular cyber-attack is a DoS/DDoS attack, which is an attempt to make a computer or network resource unavailable or idle. A common technique for executing DoS/DDoS attacks includes saturating a target victim resource (e.g., a computer, a WEB server, an API server, a WEB pplication, and the like) with a large number of external requests or volume of traffic. As a result, the target victim becomes overloaded and thus cannot assign resources and respond properly to legitimate traffic. When the attacker sends many applicative or other requests towards its victim service or application, each victim resource would experience effects from the DoS attack. A DDoS attack is performed by controlling many machines and other entities connected to the Internet and directing them to attack as a group, and by increasing the devastating potential of the attack.

One type of DDoS attack is known as an "Application Layer DDoS Attack". This is a form of a DDoS attack where attackers target application-layer processes, resources, or the applications as a whole. The attack over-exercises specific functions or features of an application to disable those functions or features, and by that makes the application irresponsive to legitimate requests or even terminate or crash. A major sub-class of application layer DDoS attack is the HTTP flood attack.

In HTTP Flood attacks, attackers manipulate HTTP requests, GET, POST, and other unwanted HTTP requests to attack, or overload, a victim server, service, or application resources. These attacks are often executed by an attack tool or tools designed to generate and send Flood of "legitimate-looking" HTTP requests to the victim server. The HTTP requests can be clear or encrypted using HTTPS protocol. The contents of such requests might be randomized or pseudo-randomized, in order to emulate legitimate WEB client behavior and evade anti-DoS mitigation elements. Examples of such tools include Challenge Collapsar (CC), Saphyra, Mirai botnet, Meris botnet, HMDDoS, Blood, KillNet, Akira, Xerxes, WEB stresser, DDoSers, and the like. Attackers are using various means to obfuscate their identity, attack traffic can come from anonymous proxies, ToR exist nodes, IoT devices, and also from legitimate home routers or hosted WEB servers.

Recently, a large number of new and sophisticated tools have been developed by hackers and are now being used in various lethal and very high-volume HTTP Flood attacks. The need for very simple and accurate solutions for HTTP Flood attack mitigation is becoming actual and urgent. Modern online services demand applicative anti-DoS solutions that are required to be able to accurately detect HTTP Floods attacks and, during an attack, characterize incoming HTTP requests as generated by attacker or by legit client, all in real-time, with very low false positive rate and very low false negative rate. Attackers keep on improving their attack tools by generating "legitimate-looking" HTTP requests, resulting in very challenging mitigation and more specific detection of applicative attacks.

Detection of HTTP flood DDoS attacks executed by such tools is a complex problem that cannot be achieved by straightforward solutions for detecting DDoS attacks. Distinguishing legitimate HTTP requests from malicious HTTP requests is a complex and convoluted task. Specifically, HTTP flood traffic can legitimately result from an increasing demand to access a web application (or resource) from legitimate users. Such behavior may be the result of a flash crowd or flash Flood conditions. That is, any efficient detection solution should require a difference between flash crowd traffic and attack traffic. The complexity of such detection results from the fact that there are dozens of attack tools that behave differently and generate different attack patterns. Further, the attack tools send HTTP requests with a truly legitimate structure (e.g., a header and payload as defined in the respective HTTP standard and follow the industry common practices) and with some parts of their requests' contents being randomized. For example, the values of HTTP headers, random query arguments and cookies key and value, and so on, can all be randomly selected. Furthermore, since the multitude of requests is high (e.g., thousands or tens of thousands of requests in each second) and there is an ever-evolving content of requests, along with the vast usage of randomization, existing DDoS detection solutions cannot efficiently detect and alert on HTTP Flood application layer DDoS attacks and accurately differentiate them from flash crowd conditions.

Accurate HTTP Floods detection methodologies require accurate learning of legitimate HTTP normal traffic baselines. Over the past couple of years, many new WEB technologies have emerged, causing legitimate WEB traffic to have a large number of behaviors, traffic volumes, WEB technologies (API applications, mobile applications, and such), network deployments, and others. All these traffic diversities challenge any means for accurate legit HTTP traffic baselining, and by that brings the HTTP Floods attack detection to be a major challenge.

It would be, therefore, advantageous to provide an efficient security solution for the detection of HTTPS flood attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include a method for detecting application layer flood denial-of-service (DDoS) attacks carried by attackers utilizing advanced application layer flood attack tools. The method comprises processing application-layer transactions received during a current time window to detect a rate-based anomaly in a traffic directed to a protected entity; processing the received application-layer transactions to determine rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent the applicative behavior of the protected entity modeled based on the application-layer transactions; determining based on a detected rate-based anomaly and a detected rate-invariant anomaly if an application layer flood DDoS is present in the current time window; and causing a mitigation action when the application layer flood DDoS is present.

Some embodiments disclosed herein include a system for detecting application layer flood denial-of-service (DDoS) attacks carried by attackers utilizing advanced application layer flood attack tools. The system includes a processing circuitry; and a memory, the memory containing instructions that, when executed by the processing circuitry, configure the controller to: process application-layer transactions received during a current time window to detect a rate-based anomaly in a traffic directed to a protected entity; process the received application-layer transactions to determine rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent the applicative behavior of the protected entity modeled based on the application-layer transactions; determine based on a detected rate-based anomaly and a detected rate-invariant anomaly if an application layer flood DDoS is present in the current time window; and cause a mitigation action when the application layer flood DDoS is present.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 5A, 5B and 5C are diagrams of window buffers utilized to demonstrate the process of updating baselines according to an embodiment.

DETAILED DESCRIPTION

Figure 1:
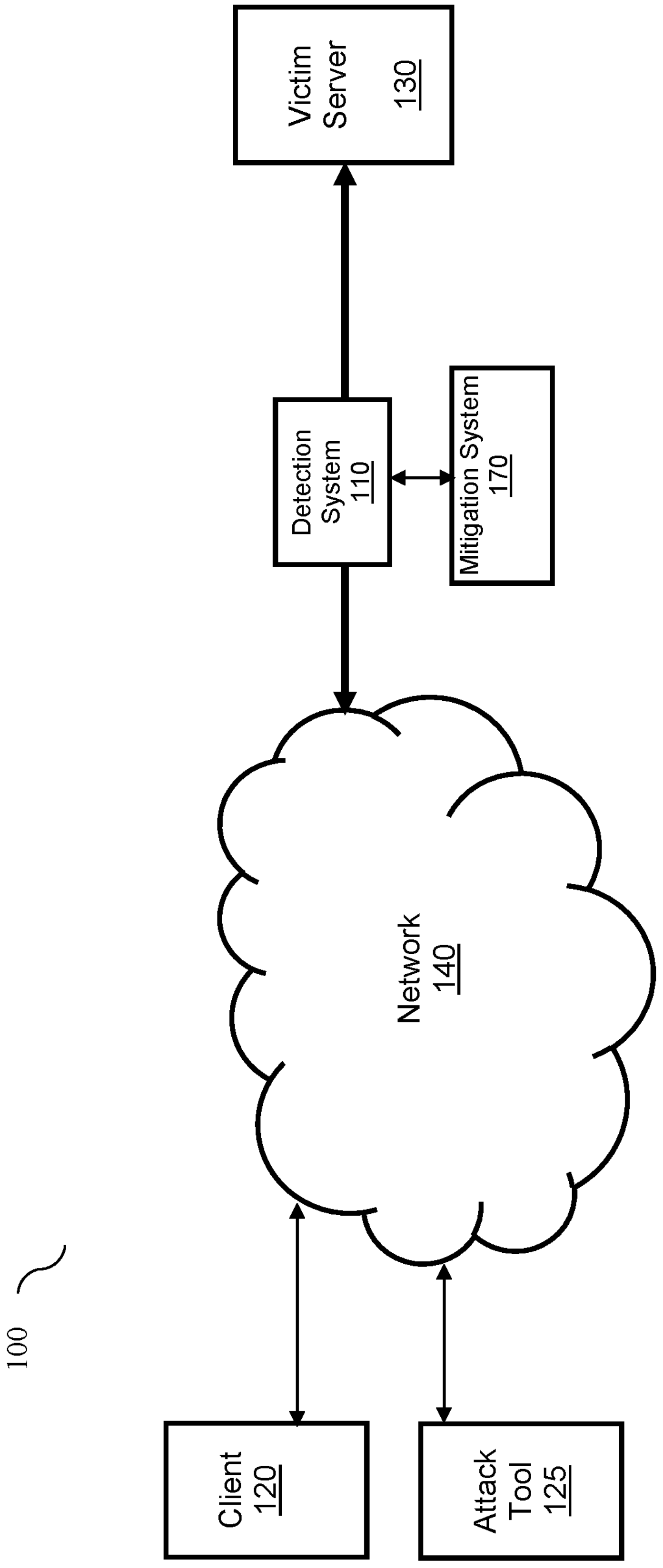
FIG. 1 is a schematic diagram utilized to describe the various embodiments for the detection of HTTP flood attacks according to some embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for the detection of HTTP flood DDoS attacks. The disclosed method distinguishes between malicious traffic and legitimate (flash crowd) traffic to allow efficient detection of HTTP Flood attacks. The detection is based on comparing a baseline distribution of application attributes (AppAttributes) learned during peacetime to distributions of AppAttributes measured during an attack time.

The AppAttributes represent the applicative behavior as presented in the application's incoming HTTP requests and outgoing HTTP responses. In an embodiment, an HTTP Floods attack time is triggered when an indication that the rate of requests has significantly increased along with an indication that major changes occurred in the application behavior, as appeared in the AppAttributes distribution. The baseline of AppAttributes models the legitimate applicative behavior of a protected entity. The disclosed methods can be performed by a device deployed in-line of traffic, or other deployments allow for both peacetime and attack time traffic observation by the device realizes the disclosed methods. The various disclosed embodiments will be described with a reference to an HTTP and/or HTTPS flood DDoS attacks, but the techniques disclosed herein can be utilized to characterize flood DDoS attacks generated by other types of application layer protocols.

The disclosed embodiments allow fast detection of HTTP flood DDoS attacks while allowing proper operation of a protected entity during a flash crowd event. It should be appreciated that the number of requests directed to a protected entity (e.g., a web application, an API application, and such) during such an attack or when a flash crowd occurs could be millions to tens of millions of requests per second. As such, a human operator cannot process such information and indicate if the received or observed traffic is legitimate or not.

FIG. 1 is a schematic diagram 100 utilized to describe the various embodiments for the detection of HTTP flood attacks according to some embodiments. HTTP flood attacks are one type of a DDoS cyber-attack. In a schematic diagram 100, client device 120 and attack tool 125 communicate with a server 130 over a network 140. To demonstrate the disclosed embodiments, the client device 120 is a legitimate client (operated by a real legitimate user or other legitimate WEB client entities), the attack tool 125 is a client device (operated, for example, as a bot by a botnet), and the server 130 is a "victim server", i.e., a server under attack can be any type of WEB based application, API based application, and the like.

The legitimate client 120 can be a WEB browser, other types of legitimate WEB application client, or WEB User Agent and the like executing over a computing device, such as a server, a mobile device, a tablet, an IoT device, a laptop, a PC, a TV system, a smartwatch and the like.

The attack tool 125 carries out malicious attacks against the victim server 130 and particularly carries out HTTP, and/or HTTPS flood attacks. The attack tool 125 generates and sends "legitimate-looking" HTTP requests with the objective of overwhelming its victims, legitimate online server's resources like victim server 130. The attacker generated HTTP requests have the correct structure and content as required by the HTTP protocol and its common practices, and because of that, these requests look "legitimate" even though they were generated by an attacker with malicious purposes. When structuring the attack, the attacker makes use of a large amount of randomization or pseudo-randomization. In some cases, the attacker structures a large set of distinct "legitimate" requests and randomly selects the HTTP requests to be transmitted as the attacking requests during selected periods of time. It should be noted that the attacker generates a large number of distinct HTTP requests to be able to evade fingerprinting and mitigation by simple WEB filtering, or other exciting means of attack mitigation. As such, detection of such attacks by a human operator is not feasible.

The attack tool 125 may be an HTTP Flood attack tool that can be deployed as a botnet, as a HTTP Flood attack tool using WEB proxies, without using WEB proxies (e.g., direct usage of hosted servers to generate the attack) or using legitimate home routers that operate as WEB proxies. This enables the attacker to disguise its Internet identity and, by eliminating any chance to naively identify his HTTP requests only by pre-knowledge of their source IP addresses. The attack tool 125 also can be deployed as a WEB stresser, DDoSers, and other "DDoS for hire" forms of attacks.

The attack tool 125 generates requests with a legitimate structure and content. To obtain the "legitimate structure", attacker-generated HTTP requests may include one or more legitimate URLs within the protected application (or victim server 130), a set of common HTTP headers, and contain one or more query arguments. The attack tool 125 can constantly include a specific HTTP header (standard headers or non-standard headers) or query arguments in its generated HTTP requests or randomly decide to include or exclude them in each generated request or set of requests. Attack tool 125 can also randomly, per transmitted HTTP transaction, decide the HTTP method and the URL to attack at the victim server.

The requests generated by attack tool 125 can also contain legitimate and varied content. To make its generated requests look "legitimate", the attack tool generated HTTP requests can have HTTP headers with legitimate values (e.g., UserAgent can be randomly selected from a pre-defined list of legitimate UserAgents, Refere can be randomly selected from a pre-defined list of legitimate and common WEB sites, e.g., facebook.com, google.com).

These overall operations of the attack tool 125 can result in a set of tens of thousands, or even millions, of distinct attacker's HTTP requests. The attacker uses randomization to select the actual HTTP request to send to its victim in each request transmission. Therefore, aiming to simply recognize the millions of distinct attacker's requests "as is" will be a very tedious, almost impossible, task. It is important to note that these tools have numerous mutations and variants, but still follow similar operations, and by that, the HTTP requests they generate are as described above. Advanced attack tools are designed to bypass simple Layer-7 filtering for mitigation by generating a large set of distinct and "legitimate-looking" HTTP requests. As such, no dominant, or frequent, set of several HTTP requests can be simply characterized as issued by the attack tool 125.

It should be noted that an attacker may craft HTTP Floods attack that uses a lower level of randomization, e.g., HTTP method is GET constantly, or without using any kind of randomization. The disclosed embodiment aims to detect HTTP Flood attacks regardless of the level of randomization realized by the attack tool used.

Requests generated by the legitimate client device(s) 120 are more diverse in their structure and content compared to the attacker's requests. The legitimate client HTTP requests potentially have more HTTP headers, standard and non-standard headers, turn to a plurality of URLs within the protected application 130, have more key-value pairs in Cookie, use more query arguments, and more. All of these attributes appear in HTTP requests and responses depending on the application activities, such as login, simple browsing to the home or landing page, turning to a specific area with the application, and such. Based on the higher diversity and unique content distribution of legitimate requests, the detection of HTTP Floods attacks and their differentiation from legitimate flash Flood may be possible.

The attack tool 125, in its basic sense, aims and is designed to arm an attacker with the ability to overwhelm as many online WEB assents as possible. As such, attack tools are neither directed nor targeted to attack a specific target. The HTTP requests crafted and then generated by an attack tool in the majority of cases are not fully targeted to the attacked application. Therefore, the attacker's requests may look legitimate, but predominantly do not necessarily include any application specific attributes. Application specific attributes, hereby referred to as AppAttributes, can be any part of the incoming HTTP requests, and their corresponding HTTP responses, that are unique to the specific protected application, or victim server 130, and by that can identify the legitimate "applicative behavior" of the protected application, or victim server 130.

The AppAttributes can be comprehended as: "something that can be simply introduced by legit clients 120 and not by attack tools like 125". This capability is utilized by this invention for the purpose of distinguishing legit traffic surges, or flash crowd, or flash Flood, from those Flood caused by an attacker. Attack tools have insignificant knowledge of the application legitimate behavior, and by that the attack traffic applicative behavior has low "proximity" to normal legitimate behavior. Flash crowds are legitimate, therefore have a legitimate nature, and by that flash crowd traffic applicative behavior has some level of "proximity" to the normal.

It should be noted that the embodiments disclosed herein are applied when multiple attack tools execute the attacks against the victim server 130 concurrently. Similarly, a vast number of legitimate client devices 120 can operate concurrently to be delivered with the services proposed by the server 130. Both client device, or devices, 120 and attack tool, or attack tools, 125 can reach the victim server 130 concurrently. The network 140 may be, but is not limited to, a local area network (LAN), a wide area network (WAN), the Internet, a content delivery network (CDN), a cloud network, a cellular network, and a metropolitan area network (MAN), a wireless network, an IoT network, or any combination thereof. Similarly, the victim server 130 can be built from one or a plurality of servers.

According to the disclosed embodiments, a detection system 110 is deployed between client device 120, attack tool 125, and victim server 130. The deployment can be an always-on deployment, or any other deployments that enable the detection system 110 to observe incoming HTTP requests and their corresponding responses during peace time and during active attacks time. The detection system 110 may be connected to a mitigation system 170 configured to characterize and mitigate attack traffic. An example embodiment for the mitigation system 170 is discussed in U.S. patent application Ser. No. 17/456,332 assigned to the common assignee.

The detection system 110 and the victim server 130 may be deployed in a cloud computing platform and/or on-premises deployment, such that they collocate together, or in a combination. The cloud computing platform may be, but is not limited to, a public cloud, a private cloud, or a hybrid cloud. Example cloud computing platforms include Amazon® Web Services (AWS), Cisco® Metacloud®, Microsoft® Azure®, Google® Cloud Platform, and the like. In an embodiment, when installed in the cloud, the detection system 110 may operate as a SaaS or as a managed security service provisioned as a cloud service. In an embodiment, when installed on-premises, the detection system 110 may operate as a managed security service.

In an embodiment, the detection system 110 and/or the mitigation system 170 are integrated together in a WAF (Web Application Firewall) device or a dedicated Layer 7 DDoS detection and mitigation device. In yet another embodiment, the detection system 110 and/or the mitigation system 170, are integrated together in any form of WEB proxy (reverse proxy and forward proxy and alike) or a WEB server. In yet another embodiment, the detection system 110 and/or the mitigation system 170 can be integrated in WEB caching systems like CDN and others.

The victim server 130 is the entity to be protected (protected entity) from malicious threats. The server 130 may be a physical or virtual entity (e.g., a virtual machine, a software container, a serverless function, an API gateway, and the like). The victim server 130 may be a WEB server (e.g., an origin server, a server under attack, an on-line WEB server under attack, a WEB application under attack, an API server, a mobile application, and so on). The protected entity may include an application, a service, a process, and the like executed in the server 130.

According to the disclosed embodiments, during peace time and during the initiation of an active attack, the detection system 110 is configured to detect changes, or fast increasements, in the transmission rate, or requests per second (RPS), of traffic directed to the server 130. Upon such detection, an indication that a potential DDoS attack is on-going may be provided. The indication of a potential attack, as the packet and/or HTTP requests transmission rate increases, may also result from flash crowd traffic. The detection indication may be referred to as a rate-based anomaly that may indicate transition from peacetime conditions. The transition may be from a peacetime condition (normal traffic, when no active attackers send traffic to the victim) to a potential attack, or to flash crowd conditions.

In an embodiment, a rate-based anomaly is determined by rate-based traffic parameters. An example of such a parameter includes, but is not limited to, Layer-7 RPS or the number of HTTP requests per second. In yet another embodiment, such parameters can include layer-3 attributes, such as like bit-per-second and packets-per-second, layer-4 attributes like, TCP SYN per second, number of TCP connections per seconds (new and existing connections), and such. A rate-based anomaly is characterized by a steep increase in the traffic rate attributes in a short period of time. To this end, a rate-based anomaly threshold is defined, as the level of RPS (or other Layer 3 or Layer 4 attributes) to be considered as legitimate or normal level of RPS such that the crossing of such threshold is indicative of a transition from a peacetime to a potential attack, or RPS anomaly. When the RPS fails to meet the anomaly threshold, it can be an indication of rate-based anomaly.

In an example embodiment, the rate-based anomaly threshold is calculated for each time window and a protected entity, using a combination of alpha filters which are configured over a short (e.g., 1 hour) and medium (e.g., 8 hours) duration. Other durations for the alpha filters are also applicable. An RPS baseline and anomaly threshold are discussed below. It should be emphasized that the comparison to the RPS anomaly threshold is performed for each time window. For example, such a time window is set to 10 seconds. The time window allows for a stable detection of an attack to occur and operate during a short period of time.

According to the disclosed embodiments, to distinguish between legitimate flash Flood and attack traffic floods, the detection system 110 is configured to examine the applicative transactions. The transactions are requests, such as HTTP requests, sent to the victim server 130, and the requests' corresponding responses, such as HTTP responses, sent by the victim server 130 as a reaction to HTTP requests it receives. The detection system 110 is configured to analyze the received transactions and determine if rate-invariant parameters in the transactions demonstrate normal or abnormal behavior of the application. An abnormal behavior indicates an HTTP flood DDoS attack, or a rate-invariant anomaly. On the contrary, normal behavior is indicative of legitimate flash crowd situations.

In an embodiment, the rate-invariant parameters are AppAttributes that have their baselines developed during peacetime and are monitored during a potential attack time. In yet another embodiment, the AppAttributes uniquely attribute legitimate behavior of HTTP requests sent to the protected entity, and corresponding HTTP responses sent by the protected entity. In yet another embodiment, the AppAttributes may be of different types. The AppAttributes types can be pre-selected, and the same set of types can be used when developing the baseline and while detecting a potential anomalous behavior.

As discussed in detail below, the detection system 110 is configured to alert of a potential HTTP flood DDoS attack based in part on a comparison between AppAttributes buffers (hereinafter "window buffers") generated for a current time window, and baseline AppAttributes buffers (hereinafter "baseline buffers") calculated over past time window. As requests generated by an attack tool do not demonstrate an AppAttributes distribution approximate to the baseline, unlike a legitimate client's AppAttributes distribution, it is expected that during attack time windows a different AppAttributes distributions are demonstrated. Using this fact, the operation of the detection system 110 would enable it to effectively distinguish flash crowd conditions from attack scenarios. Note that the baseline AppAttributes represents the victim application's legitimate, or normal, behavior. The victim application 130 unique baseline AppAttributes distributions, as learned at peacetime, describes the unique behavior of the protected application as appeared in its requests and responses.

In the example deployment, shown in FIG. 1, the detection system 110 may be connected in-line with the traffic between the client device 120 and the attack tool 125 toward the victim server 130. In this deployment, the detection system 110 is configured to process ingress traffic from the client device 120 and the attack tool 125, as well as egress traffic, or the return path, from victim server 130 back to device 120 and, in cases of attack, the attack tool 125.

In yet another configuration, the detection system 110 may be an always-on deployment. In such a deployment, the detection system 110 and the mitigation system 170 are part of a cloud protection platform (not shown). In yet another embodiment, a hybrid deployment can be suggested, where the detection system 110 is deployed on the cloud, and the mitigation system 170 is deployed on-premises close to the victim server 130.

It should be noted that although one client device 120, one attack tool 125, and one victim server 130 are depicted in FIG. 1, merely for the sake of simplicity, the embodiments disclosed herein can be applied to a plurality of clients and servers. The clients may be located in different geographical locations. The servers may be part of one or more data centers, server frames, private cloud, public cloud, hybrid cloud, or combinations thereof. In some configurations, the victim server 130 may be deployed in a data center, a cloud computing platform, or on-premises of an organization, and the like. The cloud computing platform may be a private cloud, a public cloud, a hybrid cloud, or any combination thereof. In addition, the deployment shown in FIG. 1 may include a content delivery network (CDN) connected between client 120 and attack tool 125 and to server 130. In an embodiment, the detection system 110, and the mitigation system 170, are deployed as part of the CDN.

The detection system 110 may be realized in software, hardware, or any combination thereof. The detection system 110 may be a physical entity (an example block diagram is discussed below) or a virtual entity (e.g., virtual machine, software container, micro entity, function, and the like).

Figure 2:
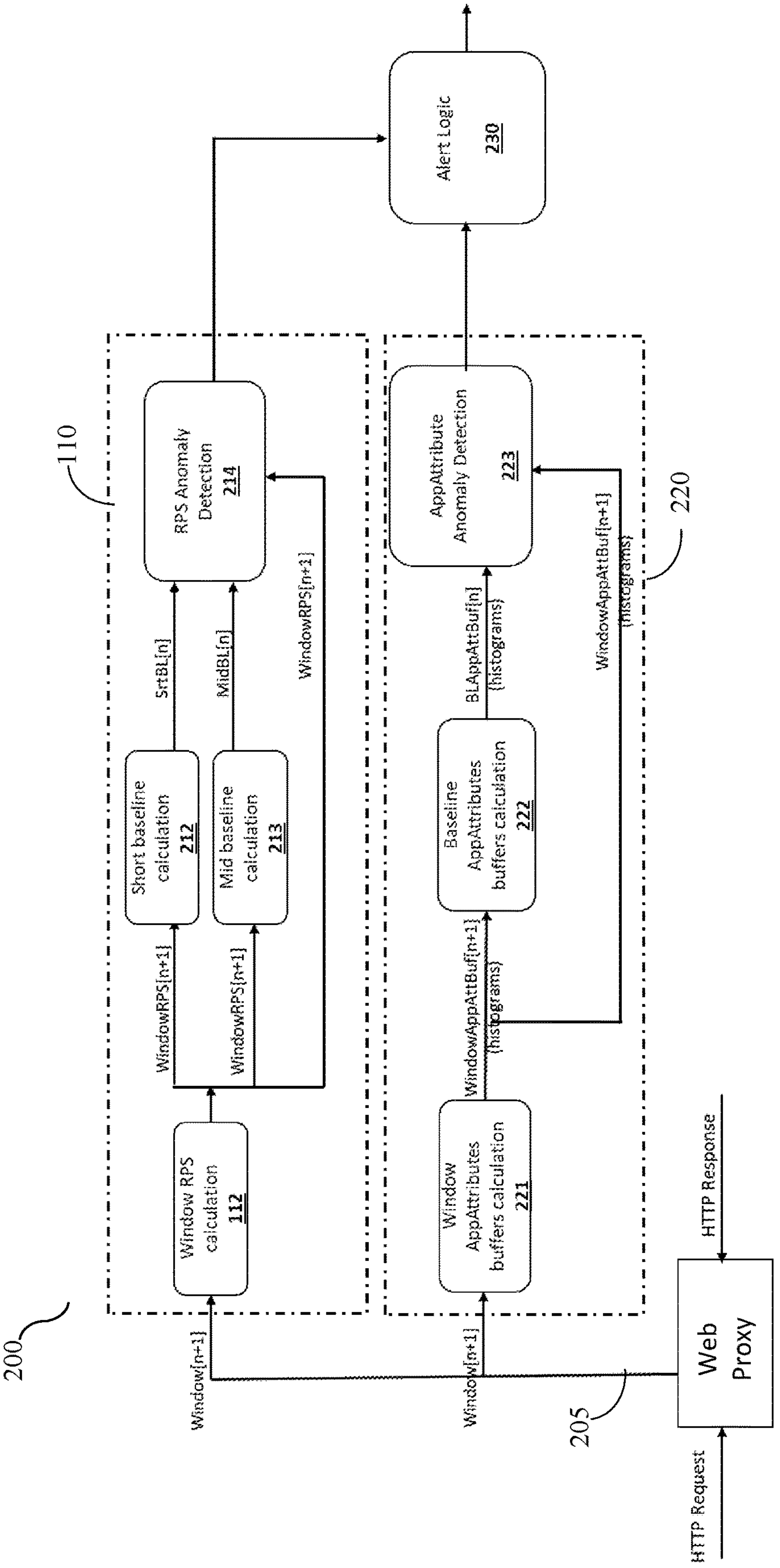
FIG. 2 is a flow diagram illustrating the operation of the detection system according to some embodiments.

FIG. 2 shows an example flow diagram 200 illustrating the operation of the detection system according to some embodiments. The detection of HTTP flood attacks is performed during predefined time windows, where an indication can be provided at every window. The baseline is developed over time based on transactions received during peacetime. There are two paths of detection:rate-based (labeled 210) anomalies detection and rate-invariant (labeled 220) anomalies detection. In an embodiment, rate-based features are traffic-related features that tend to be increased during time periods when the traffic increases. In another embodiment, rate-invariant features are traffic-related features that do not tend to be increased during time periods when the traffic is increasing.

The rate-based path 210 will be discussed with reference to a specific rate parameter, the total number of requests per second (RPS) as arrived towards the victim server.

Transactions 205 as received by the detection system 110 are fed to both paths for processing. This may include receiving the traffic by a WEB proxy, to decrypt the traffic, when HTTPS is used, render the incoming requests and their corresponding responses. In an embodiment, described in FIG. 2, the WEB proxy is part of the detection system 110. In yet another embodiment, the WEB proxy can be external (e.g., a CDN, a WEB server, etc.) to the detection system 110. In the latter case, the detection system 110 is configured with a pre-defined interface to the WEB proxy to further receive the WEB transactions arriving to, or from, the victim server 130. The processing is performed per time window, but continuously through the operation of system 110. A duration time window is a few seconds, e.g., 10 seconds long.

In the rate-based path, a check is attempted for a potential attack to be initiated due to an increase in the number of transactions and their rate. Specifically, at block 210, the RPS of the current window (n+1, wherein 'n' is an integer) is computed. The value of the RPS[n+1] is computed as follows:

$$\text{WinRPS}[n+1]=\text{total requests/time window duration} \quad \text{Eq. 1}$$

Where, the total number of requests is the number of requests received during a time window [n+1]. Then, short and medium baselines are computed at blocks 212 and 213, respectively. The baselines SrtBL[n] and MidBL[n] are the mean and variance values of the RPS when applying different alpha filters on such values. In an embodiment, the mean and variance (var) values may be computed using an alpha filter as follows:

$$\text{RPS\_mean}_{[n+1]} = \text{RPS\_mean}_{[n]} \cdot (1-\alpha) + RPS_{[n+1]} \cdot \alpha \quad \text{Eq. 2}$$

$$\text{RPS\_var}_{[n+1]} = \text{RPS\_var}_{[n]} \cdot (1-\alpha) + RPS_{[n+1]} \cdot \alpha + \text{RPS\_mean}^2_{[n]} \cdot (1-\alpha) + \text{RPS\_mean}^2_{[n+1]} \quad \text{Eq. 3}$$

Where the 'α' value for the 'short' baseline (SrtBL[n]) is smaller than the a value for the 'mid' baseline (MidBL[n]). The SrtBL[n] and MidBL[n] baselines are defined using the $\text{RPS\_mean}_{[n+2]}$ and $\text{RPS\_var}_{[n+2]}$. The RPS_var is the variance of the measured RPS, correspondingly.

In an embodiment, the short baseline is utilized to follow hourly increasements in RPS, especially for 24 by 7 legitimate WEB traffic patterns, and by that, uses an alpha fitting for averaging over the last hour. The medium ('mid') baseline is utilized to follow burst RPS traffic patterns. In an embodiment, the duration of the alpha filter can be configured to dynamically fit other types of patterns and attack detection sensitivities. In yet another embodiment, the detection system 110 supports multiple alpha filters to cover other types of patterns and multiple integrations, or averaging, periods.

At the RPS anomaly detection block 214, each of the SrtBL[n] and MidBL[n] baselines are used to build an RPS anomaly threshold (TH). In peacetime at the end of each time window, e.g., each 10 seconds, the RPS anomaly threshold (TH) calculated for the previous time windows, is compared against the current WindowRPS to find an RPS anomaly. In an embodiment, the threshold for an RPS anomaly, for window n+1, may be defined as follows:

$$RPS \text{ anomaly } TH[n+1] = \max\{(RPS \text{ anomaly } TH)_{\alpha-short}, (RPS \text{ anomaly } TH)_{\alpha-mid}\} \quad \text{Eq. 4}$$

where:

$$(RPS \text{ anomaly threshold})_{\alpha} = \max\left\{\begin{matrix} (averageFactor) * \\ (\text{RPS\_mean}, \text{RPS\_mean} + \\ \text{STD\_Factor} * SQRT(\text{RPS\_var}) \end{matrix}\right\} \quad \text{Eq. 5}$$

where $\text{RPS}_{mean}$ is the mean of the RPS as computed in Eq. 2, $\text{RPS}_{var}$ is the variance of the RPS as computed in Eq. 3, the alpha (short and mid), MAF or the Minimum Attack Factor, STD_Factor values are predefined. The Minimum Attack Factor is defined as the minimum multiplication of the attacker RPS over the legitimate level of RPS, to be considered an HTTP Floods attack. For example, for MAF=3, only WindowRPS volumes of above 3 times RPS_mean can be considered as RPS anomaly. Another possible case for RPS anomaly is when the WindowRPS is higher than the baseline together with STD_Factor times the calculated standard deviation (the square root of the RPS_var). It should be noted that RPS is only one example of a rate-based parameter, and other parameters, like layer 3 and layer 4 attributes, can be used herein.

The values of 'α' are preconfigured, where the higher the 'α' value is, the weight given to the current window RPS, or to the WinRPS[n+1], value is higher, comparing the previously received RPS. The lower the 'α' value is, the weight given to past RPS values is higher, comparing the RPS received in current window, which means a slow reaction to relatively fast (hourly) changes in RPS. In an example, a short 'α' value is set to 0.005 and a mid 'α' value is to 0.0008 for the mid filter.

When the value of the current window RPS WinRPS[n+1] exceeds the RPS anomaly threshold [n+1], an RPS rate-based anomaly is decided.

In the rate-invariant path 220, it is checked if there is a deviation from the AppAttributes baseline behavior for the current time window. According to the disclosed embodiments, each protected application is assigned with a set of two buffers: baseline and window. Each set of the baseline and window buffers contains buffers for each AppAttributes type. Examples of AppAttributes types are provided herein.

Application Attributes, or AppAttributes, are attributes in HTTP requests and response header, mainly keys, that uniquely attribute the victim server application legitimate behavior as can be inferred by analyzing the application legitimate HTTP requests and their corresponding HTTP responses. In an embodiment, the AppAttributes can be described as a "feature vector" that includes the several AppAttributes types.

In yet another embodiment, AppAttributes type can be the keys of non-standard HTTP headers (or unknown HTTP headers) in HTTP requests, the key of each cookies in the cookie header in HTTP requests, the key of each query argument in requests URL, the HTTP request sizes, the HTTP response sizes, the HTTP response status code, source client IP address attributes, as appeared in X-Forwarded-For header or in Layer 3 IP header, like geo-location (e.g. country and city) and ASN assignments and the like, User Agent values, the TLS figure printing values computed over client-hello messages in the incoming traffic, the distribution of the time duration in seconds between HTTP request and their corresponding HTTP response, the key of each cookies in cookie of HTTP response set-cookie header. When selecting AppAttributes types it is essential to select applicative attributes that their values and distributions uniquely identify legitimate traffic, as presented in legitimate traffic, but cannot be introduced by an attack tool. This is because transactions generated by the attack tool are generic as the attack tool is not targeted to the specific victim server application. As such, it is to assume that requests crafted by an attack tool will not have an AppAttributes distribution similar to the distribution legit client's requests have. In an embodiment, the AppAttribute provides a measure to distinguish flash crowd conditions from attack scenarios.

Figure 3:
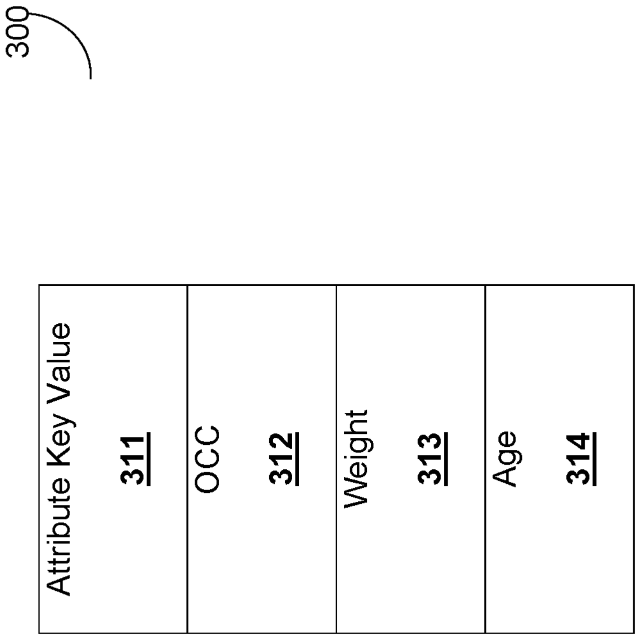
FIG. 3 is a structure of a window or baseline buffer according to an embodiment.

An example of AppAttributes buffer 300, which is a window buffer or a baseline buffer, is shown in FIG. 3. The buffer 300 includes an AppAttribute key value field (311), an occurrence (occ) field (312), a weight field (313), and an age field (314).

The AppAttribute key value field (311) includes a name of the key value, such as query arguments (args) name, a non-standard HTTP header name, a cookies name, an HTTP request size range, an HTTP response size range, an HTTP response status code (e.g., 200), source IP address attribute (geo, ANS and alike), User Agent values, TLS figure print attribute, a set-cookie cookies name and the like. The Occ field (312) represents the number of occurrences, or the average number of occurrences, for an AppAttributes specific key value over a period of time. The weight field (313) includes the AppAttributes specific key value occurrences relating to other AppAttributes (from the same type) appeared in the same received HTTP requests. As an example, the weight value may be set to:

$$\text{Weight} = 1/(\text{total number } \textit{AppAttributes} \text{ appeared in a transaction}) \quad \text{Eq. 6}$$

The age field (314) represents the last time an AppAttribute key value was observed in a received HTTP request.

For each AppAttributes type multiple buffers are created, one for each AppAttribute key value. The buffers are saved in a memory of the system 110, and the number of buffers, in an embodiment, is limited to allow safe memory management and eliminate an attacker to overwhelm detection system 110 memory during an active attack, where a vast number of new AppAttribute keys value might be appeared. Attack tool is, in many cases, not aware of the whole list of legitimate AppAttributes of each type, therefore in many cases attack tool 125 uses randomized AppAttributes keys value. During an active volumetric attack, a very large number, ten thousand or even millions, of new AppAttributes keys are expected to be appeared. The baseline buffers are built as a set of AppAttributes buffer 300 as shown in FIG. 3. The baseline represents histogram (statistical distribution) of the AppAttributes keys values occurrences and/or weights from a first throughout the last time window. In an embodiment, a set of buffers from the baseline buffers are pre-set with key values. In an embodiment, such AppAttributes key values may be learned during a learning phase of the system 110 and thereafter through continuous learning during peace time. The baselining includes adding new key values buffers to the existing buffers that were observed during peacetime. The baseline buffers are updated each 10 seconds window (only when no active attack is detected), based on data aggregated on the window buffers.

It should be noted that the baseline represents the behavior of AppAttributes as it appeared at the protected application during peace time. In an embodiment, the peace time baseline is compared to the AppAttributes appearance behavior during anomaly window, and by that enables the detection of rate invariant applicative anomalous behavior.

The window buffers are also built as a set of AppAttributes buffer 300 as shown in FIG. 3 and it represents the histogram over the AppAttributes occurrences for the last time window only. That is, the window buffers are matched in their structure to the baseline buffers. For each AppAttributes type, the window buffers are divided into two sections. One section contains AppAttributes keys pre-assigned to AppAttributes from the baseline buffers. The second section is pre-allocated with AppAttributes buffer to be assigned for new AppAttributes keys values. The structure of a buffer as disclosed here ensures accounting for previously observed AppAttributes and eliminate new arriving AppAttributes from overwhelming the window buffers. The update of window AppAttributes buffer includes parsing an incoming transaction (request and response) to identify an AppAttribute and add or update a key value in the respective buffer; incrementing the occ field (312), if applicable, updating the weight field (313) based on Eq. 6 above; and setting the age field (314) to a timestamp of a current window time. The update of window buffers is performed for each time window. In an embodiment, the respective buffers are updated by each incoming HTTP transactions. In yet another embodiment, the respective buffers are updated by sampled incoming HTTP transactions. The sampling can be for 1 in N transactions, the first N transactions in a time window, and similar. In yet another embodiment, the sampling rate N can be different for peacetime conditions and attack time conditions, to better adjust to the number of HTTP requests transmitted toward the protected entity.

In an embodiment, the baseline buffers are updated as long as there is no RPS anomaly, and no active HTTP Floods attack is detected. Further, an aging mechanism is applied on the baseline buffers, where values in the buffer that are older (according to their age value) than an aging threshold, are removed.

Figure 10A:
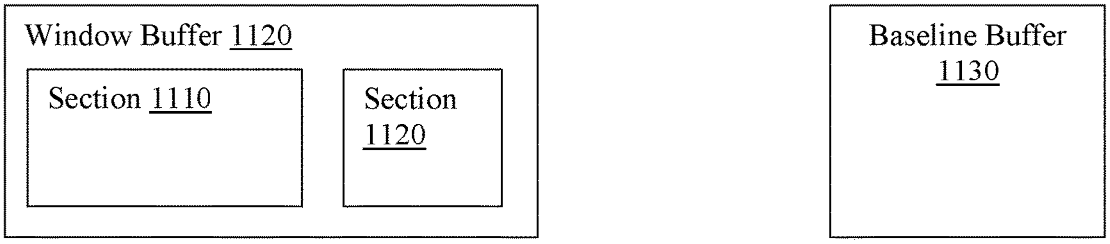
FIGS. 10A, 10B, 10C, and 10D illustrate the building and updating of baseline and window buffers according to an embodiment.

FIG. 10A illustrates a structure of the baseline buffers and the window buffers and the processes to build and update of such buffers. A set of buffers for a single AppAttributes type, e.g., query arguments keys, cookies keys and so on, is shown in FIG. 10 for ease of the description.

A window buffers 1100 includes 2 sections: a baseline values section 1110 and a first values section 1120. Each of these sections is built from a set of buffers; each buffer is built from a set of fields as depicted in FIG. 3. The values in the section 1110 are copied from the baseline buffers 1130 at the beginning of each window. In the section 1120, new values observed during a time window for the first time, i.e., values that do not appear in the baseline section, are recorded. The size of the section 1120 is limited not to saturate the system's resources during an active attack. That is, the section 1120 is configured to record or buffer up to a certain pre-defined number of new values.

The baseline buffers 1130 includes the baseline of AppAttributes for a specific AppAttributes type. The baseline buffers 1130 are built from a set of buffers, each buffer is built from a set of fields as depicted in FIG. 3. The values in the baseline buffers 1130 are updated at the end of each of time window to include the values buffered in both sections 1110 and 1120 of window buffers throughout the last time window. It should be noted that the baseline buffers 1130 is updated only if no attack is detected during the time window. The baseline buffers 1130 are aggregated with AppAttributes values learned during a learning phase. However, once the system 110 is deployed and in operation, the system baseline buffer 1130 is continuously updated at the end of each time window with values observed during peacetime. In an embodiment, the time window is set to 10 seconds.

Figure 10B:
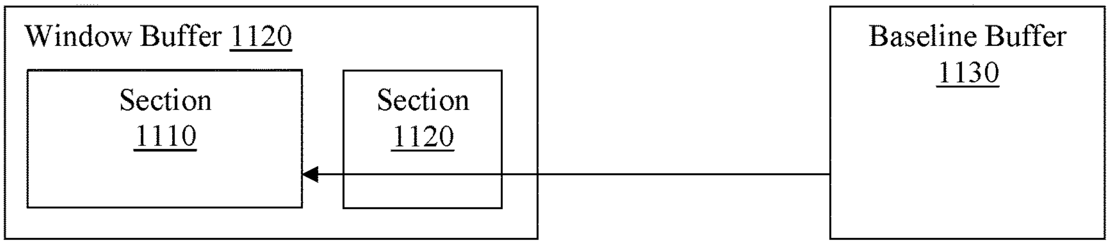
Figure 10C:
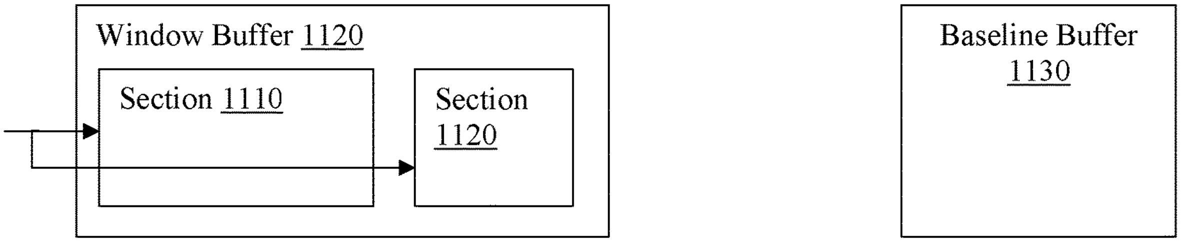
Figure 10D:
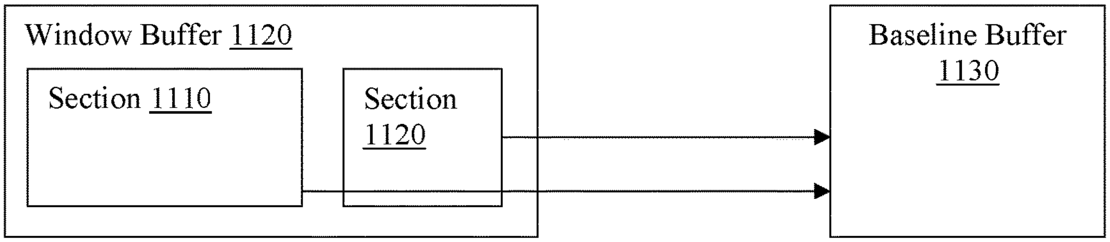

FIG. 10B demonstrates the update of window buffers 1100 at the end of each time window, with AppAttributes values learned and aggregated in the baseline window. FIG. 10C demonstrates the update of window buffer 1100 during each time window according to values appeared in the incoming HTTP requests and response. Here it is assumed that new AppAttributes values are observed during a time window. FIG. 10D demonstrates the update of baseline buffer 1130 at the end of each time window where normal activity is observed with AppAttributes appearing in web transactions received during the time window just ended. For AppAttributes existing in the baseline need to update their occ and weight fields. For new AppAttributes, new buffers should be allocated in the baseline buffers with the window occ and weight fields.

Referring to FIG. 2, at block 221, window buffers (WinAppAttBuf[n+1]) are computed at the end of the window based on transactions received at a time window (n+1). The WinAppAttBuf[n+1] buffers are histograms fed to block 222 to update the baseline buffers with current window (n+1) AppAttribute values and to block 223 to determine if there is a rate invariant anomaly based on the AppAttributes. The actual update of the baseline buffers is performed only when no active attack is detected as it is undesirable to allow attackers any means to influence the AppAttributes normal baseline values.

Figure 4:
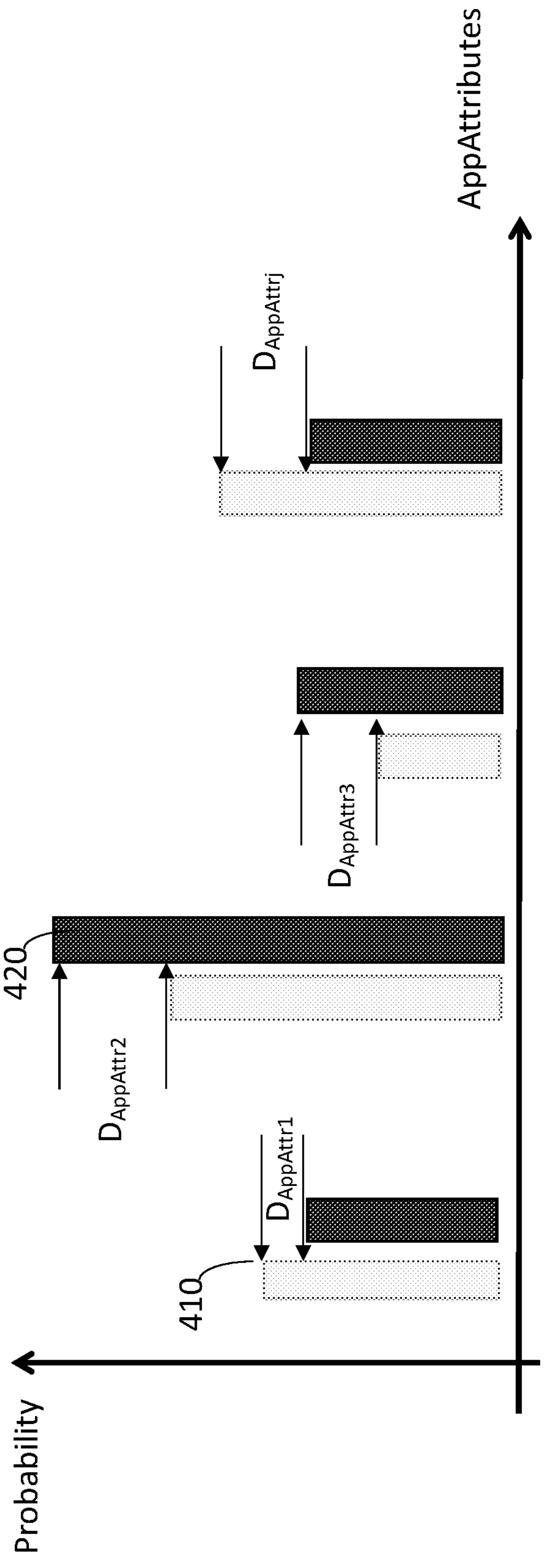
FIG. 4 demonstrates a distribution density function for a query arguments type of AppAttributes according to an embodiment.

Specifically, the determination of AppAttributes anomalies is based on an attack proximity indicating how statistically close the WinAppAttBuf[n+1] window buffers are to the BLAttBuf[n] baseline buffers. Each AppAttributes buffer can be presented as a single bar, and the entire buffers from a specific type can be presented as a histogram where the AppAttribute key value is the X axis of the histogram and the occurrences, or the weight represents the Y axis of the histogram. From these histograms, form both window and baseline buffers, the AppAttributes probability density function, or the distribution, can be computed to represent the probability of the appearance of each AppAttribute. For example, a distribution density function for a query arguments type of AppAttributes is shown in FIG. 4. The X Axis shows AppAttributes keys values, and the Y axis shows probabilities to encounter each the AppAttribute in a request. The bars 410 are baseline buffers and the bars 420 are of window buffers.

In an embodiment, the probabilities (Pr) are determined based on the weight values in the buffers. In an embodiment, a probability of each AppAttribute (e.g., $AppAtt_i$) positioned at buffer i in buffers) may be computed as follows:

$$Pr\ AppAtt_i = \frac{\text{weight}_i}{\sum_j \text{weight}_j} \quad \text{Eq. 7}$$

In an embodiment, the attack proximity represents the statistical distance between the AppAttributes window distribution, and the AppAttributes baseline distribution, for each AppAttributes type.

In an embodiment, the statistical distance between the AppAttributes window distribution, and the AppAttributes baseline distribution, for each AppAttributes type, can be computed using methods, such as Total Variation distance, Bhattacharya coefficient, Kolmogorov metric, Kantorovich metric, other methods for computing probability metric means.

In an embodiment, the attack proximity is calculated using the Total Variation approach. The Attack proximity is calculated as the sum of all total variation metrics computed for each of the various AppAttributes types. An AppAttributes type total variation metric is a sum of metric distances between the window and baseline probabilities of the specific type. Such metric distances are labeled in FIG. 4 is a $D_{Keyval\#i}$ (i=1 . . . , r, and r is the number of key values, or buffers in the buffers). The AppAttributes total variation metric can be computed as follows:

$$AppAttribyte\ \text{Total Variation Metric} = \sum_{AppAtt\#i} D_{AppAtt\#i} \quad \text{Eq. 8}$$

where:

the metric distance $D_{AppAtt\#i}$ can be computed as follows:

$$D_{AppAtt\#i} = |\text{Baseline } P_{AppAtt\#i} - \text{Window } P_{AppAtt\#i}|$$

where, Baseline $P_{AppAtt\#i}$ and Window $P_{AppAtt\#i}$ are the baseline and window probabilities of AppAttributes i, respectively. In an embodiment, the AppAttributes Total Variation Metric can get values from 0 (the two distributions are identical) to 2 (the two distributions are different from each other). In an embodiment, the AppAttributes metric for each type is calculated using Total Variation. In yet another embodiment, the AppAttributes metric is calculated using other Probability Metric like Bhattacharya coefficient and others.

Continuously, the attack proximity is calculated as a summary of all AppAttribute total variation Metric over all AppAttributes types:

$$\text{Attack Proximity} = \sum_{AppAttribute\ type\ i} AppAttributeTotalVariationMetric\ i \qquad \text{Eq. 9}$$

In yet another embodiment, the attack proximity is calculated as a weighted summation over the various AppAttributes types, where each type can get a different weight to express its importance over other AppAttributes types. The higher the weight is, the higher importance the specific AppAttributes type gets.

For AppAttributes type represents sizes, like HTTP requests and responses sizes, the histogram is set with static ranges. For example, for HTTP requests and response sizes for size the range in bytes would be, for example, fixed ranges like 1-100; 101-1000; 1001-10000, over 10000. For HTTP response size the size of "0" represents WEB transaction without a response, or HTTP request without any corresponding HTTP response. In yet another embodiment, dynamic and adaptive histogram ranges can be suggested to accurately represent peacetime size distribution.

When specific incoming WEB transaction does not include any value for the specific AppAttributes type, the AppAttributes is to be considered as with "None" value.

For an example, when the HTTP request does not contain cookie, the cookie AppAttributes key value is considered to be "None", and its Occ and Weight fields are to be updated and incremented by 1 accordingly.

Returning to FIG. 2, at block 223 the computed attack proximity is compared to a proximity threshold. When the attack proximity exceeds proximity threshold, an AppAttributes anomaly, or rate invariant anomaly, for the current window (n+1) is set. A HTTP Flood DDoS attack is declared when both an AppAttributes anomaly and RPS anomaly are set. When only the RPS anomaly is set, the increase in traffic may be due to a flash crowd.

In an embodiment, the proximity threshold is preconfigured. In another embodiment, a proximity threshold may be computed as follows:

$$\text{ProximityThreshold} = \text{NumOfValidAppAtt} * \text{TotalVariationFactor}$$

That is, the proximity threshold is a multiplication of number of valid AppAttributes with a preconfigured parameter (TotalVariationFactor). Factoring valid AppAttributes is required to reduce a false positive rate, where flash crowd scenarios are considered as attacks. An AppAttribute is considered valid if both the window and baseline "None" value distributions are below a pre-defined threshold.

In an embodiment, AppAttributes type is considered as "valid" for attack detection if the "None" probability for window or baseline distribution is less than a pre-defined "None threshold" (e.g., 0.5). If both window and baseline "None" probability is higher than the "None threshold," the AppAttribute is considered as not valid to be part of attack proximity calculation and by that the proximity threshold should be tuned to fit a different number of valid AppAttributes types.

In an embodiment, the proximity threshold is dynamically learned during peace time using anomaly detection approaches. Another embodiment uses an Alpha filter, or exponential averaging, to calculate the attack proximity mean and variance. The Attack Proximity threshold is then calculated as the calculated mean with added pre-defined multiplication of the calculated attack proximity standard deviation.

At block 230 an alert logic determines if a Flood DDoS attack is detected. Specifically, the rate-invariant and rate-based indications are processed to determine what type of an alert to output. Specifically, when the rate-invariant and rate-based anomaly indications are set, an alert on a HTTP Floods attack is generated and output. When the rate-based anomaly indication is set and rate-invariant normal indication is output, an alert of flash crowd traffic is output. In all other combinations, no other alerts are set.

FIGS. 5A, 5B, and 5C are example window buffers utilized to demonstrate the process of updating the baseline. The baseline buffers are updated during peacetime when no anomalies are reported. The buffers utilized in the process are window and baseline. The window attribute buffers hold an aggregation of the current values observed during each time window. The baseline buffers hold the normal baseline. Both the baseline and window buffers are structured as a group of buffers as the one described in FIG. 3, but the number of buffers in each of the buffers may be different but per-defined. In an embodiment, the number of buffers, in window buffers, that can be created in response to new AppAttributes is pre-determined. This is performed to prevent creation of a large number of buffers during attacks, thereby saturating the resources of the system. In this example, the AppAttributes type is of URL query arguments.

As shown in FIG. 5A, the buffers 510-1 through 510-3 are buffers set for AppAttributes included in the baseline. At time '0', at the beginning of time window, the buffers 510-1, 510-2, and 510-3 are set to include the '_ga', '_g', and 'page' key values. These key values are existing AppAttributes that are copied from the respective baseline buffers (see also section 1110 in FIG. 10), with occ and weight set to zero. The buffers 510-4 and 510-5 are left empty and kept for new AppAttributes that might be appeared in the time window (see also section 1120 in FIG. 10). It should be noted that the window buffers are continuously updated.

For the baseline buffers, at the end of each time window (with no other anomalies found) for an already existing AppAttributes, the 'occ' field of its corresponding buffer is incremented with 'ooc' from the window buffer, and the weight and age fields are also updated. The number of buffers that can be allocated to new observed AppAttributes are predetermined. Then, the respective 'occ', 'weight', and 'age' fields are updated accordingly.

Following the above example, at a time window t=1, an HTTP request includes the following URL query arguments:

//www.domain.com/url?_ga=2.89&_gl=1093

The '_ga' and '_g' are included in the URL arguments and would be included in the window AppAttributes. At the conclusion of t=1, if no attack is detected, values baseline buffers are updated to include the values of the respective buffers shown in FIG. 5B.

At the next time window t=2, an HTTP request includes the following URL query arguments:

//www.domain.com/url?
ga=2.89&_gl=1093&location=zambia

Here, the query argument named 'location' appears in the request. Thus, a new AppAttribute is identified and should be added to the new AppAttributes buffer allocated within the window buffer. As there are 2 free buffers (510-4 and 510-5), a buffer 510-4 is updated to include the AppAttributes 'location'. Then, the fields of buffers 510-1 through 510-4 are updated as shown in FIG. 5C. At the end of time window t=2, assuming no active attack is detected, the baseline window buffers are updated with all value aggregated in the window buffers and here with new AppAttributes for query args. A new buffer is allocated in baseline AppAttributes only if there are free buffers to allocate in the baseline buffers. The baseline buffers are also updated to remove aged out AppAttributes.

In an embodiment, for each AppAttributes type the 'ooc' and 'weight' of all incoming HTTP requests and their corresponding responses are accumulated in the window buffers by a simple addition. At the end of the time window, the aggregated AppAttributes 'ooc' and 'weight" from the window buffers is aggregated in the corresponding baseline buffers by a simple addition. In another embodiment, the window buffers' ooc' and 'weight" are aggregated into the baseline buffers using exponential average, of Alpha filter, as described in the following equation:

$$\text{weight\_mean}_{[n+1]} = \text{weight\_mean}_{[n]} \cdot (1-\alpha) + \text{weight}_{[n+1]} \cdot \alpha \qquad \text{Eq. 10}$$

The alpha can be set average over the last hour, e.g., the 'a' value is set to 0.005.

According to the disclosed embodiment, an end of attack is detected, when a few consecutive windows the following conditions should be satisfied:

1. The RPS (request per second) returns to a normal RPS baseline value;
2. The RPS is below an RPS anomaly threshold (RPS TH); or
3. The AttackProximity is below a ProximityThreshold In order to avoid oscillations between an active attack and end-of-attack detection, some margins can be applied. For example, when attack start if RPS>baseline RPS, but same attack will end only if RPS<0.5*baseline RPS.

Figure 6:
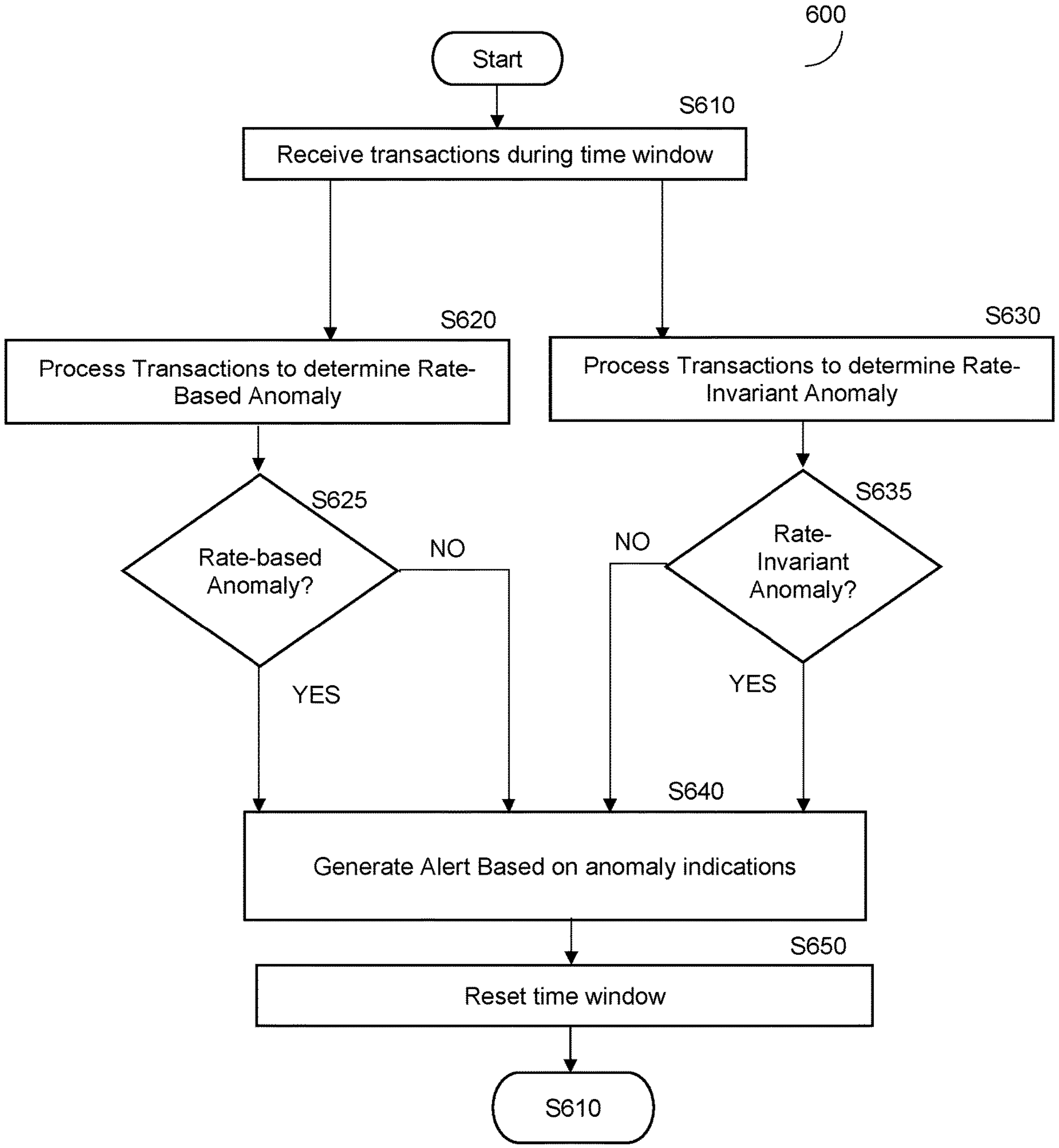
FIG. 6 is a flowchart illustrating a method for the detection of HTTP flood attacks according to an embodiment.

FIG. 6 shows an example flowchart 600 illustrating a method for the detection of HTTP flood attacks according to an embodiment. In an embodiment, the method may be performed using the detection system 110. The method illustrated by flowchart 600 is performed during peace time, where there is no active attack detected.

At S610, transactions are received during a time window. The duration of the time window is predetermined, and such window starts and finishes during the execution of S610. The received transactions are web transactions, and typically include HTTP requests to and their corresponding responses to/from a protected entity hosted by a victim server.

At S620, the received transactions are processed to determine if there is a rate-based anomaly in traffic directed to the victim server. In an embodiment, the rate-based anomaly is determined for at least one rate-based parameter including, but not limited to, an RPS over the total transactions received during the time window. The execution of S620 is further discussed with reference to FIG. 7.

At S625, it is checked if a rate-based anomaly is determined, and if so, a rate-based anomaly indication is set; otherwise, a rate-based normal indication is output to S640. The rate-based normal indication is provided to S640 to allow for learning a baseline of the rate based and rate-invariant behavior. Both anomaly and normal indications are provided to S640.

At S630, the received transactions are processed to determine if there is a rate-invariant anomaly in traffic directed to the victim server. In an embodiment, the rate-invariant anomaly is determined for a plurality of AppAttributes including, but not limited to, non-Standard HTTP headers (or unknown headers); cookies; query arguments in a URL; a HTTP request size, a HTTP response size; a challenge response, a HTTP response status code, User Agent values, client IP ego and other attributes, incoming traffic TLS fingerprinting, and the like. The execution of S630 is further discussed with reference to FIG. 8.

At S635, it is checked if a rate-invariant anomaly is determined, and if so, a rate-invariant anomaly indication is set; otherwise, a rate-invariant normal indication is output. Both anomaly and normal indications are provided to S640.

At S640, the rate-invariant and rate-based indications are processed to determine what type of an alert to output. Specifically, when the rate-invariant and rate-based anomaly indications are set, an alert on an attack is generated and output. Further, when the rate-based anomaly indication is set and rate-invariant normal indication is output, an alert of flash crowd traffic is output. In all other combinations, no other alerts are set.

In an embodiment, when an attack alert is generated, a mitigation action can be taken. A mitigation action may include blocking requests, responding with a blocking page response, reporting and passing the request to the protected entity, and so on. In an embodiment, a mitigation resource may be provided with the characteristics of the attacker as represented by the dynamic applicative signature. That is, the general structure of HTTP requests generated by the attacker is provided to the mitigation resource. This would allow for defining and enforcing new mitigation policies and actions against the attacker. Examples of mitigation actions are provided above.

In an embodiment, the mitigation action includes blocking an attack tool at the source when the tool is being repetitively characterized as matched to the dynamic applicative signature. For example, if a client identified by its IP address or X-Forwarded-For HTTP header issues a high rate of HTTP requests that match the dynamic applicative signature, this client can be treated as an attacker (or as an attack tool). After a client is identified as an attacker, all future HTTP requests received from the identified attacker are blocked without the need to perform any matching operation to the signature.

At S650, the time window is reset, and execution returns to S610 where transactions received during a new time window are processed.

In an embodiment, when an attack is detected, the method may also determine an end-of-attack condition. Such a condition is detected when a preconfigured number of consecutive time windows rate-invariant or rate-based normal indications are output.

The normal conditions are met when window_RPS or attack proximity are going below the normal baseline thresholds, RPS anomaly threshold or proximity threshold, multiply by some pre-defined factor (e.g., 0.8) to avoid oscillations.

When end of attack is detected, a grace period of a few time windows is dictated in order to enable safe transition back to peace time.

Figure 7:
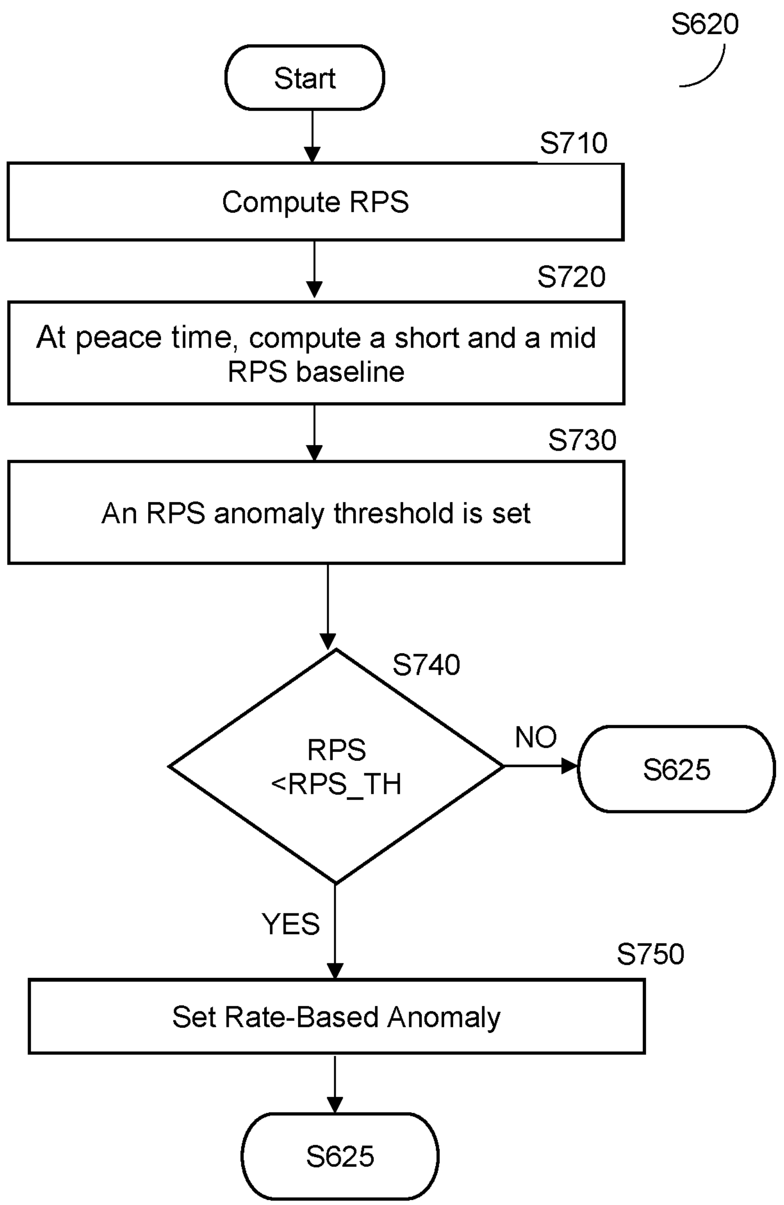
FIG. 7 is a flowchart describing a method for detecting a rate-based anomaly according to an embodiment.

FIG. 7 shows an example flowchart S620 describing a method for detecting a rate-based anomaly according to an embodiment. The method will be discussed with reference to a specific example where a rate-based anomaly is determined respective to a packet per second (RPS) parameter.

At S710, the RPS of transactions received during the current window is computed as the number of received transactions (e.g., HTTP request) divided by the duration of the time window in seconds.

At S720, a short RPS baseline and a mid RPS baseline are determined. These baselines are the means and variance of the RPS as measured for previous time windows while applying different values of alpha filters and when there is no active attack. The short RPS baseline and a mid RPS baseline are discussed in more detail above. It should be emphasized that S720 is performed only during peace time when no attack is detected.

At S730, an RPS anomaly threshold is set based on the RPS baselines. In an embodiment, such a threshold is set a maximum value between the short and mid RPS thresholds calculated based on the short and mid RPS baselines.

At S740, the RPS for the current time window (WinRPS [n+1]) as determined at S710 is compared to the RPS anomaly threshold (RPS_TH). If the RPS exceeds the threshold, a rate-based anomaly is determined (S750). Then, execution returns to S625 (FIG. 6).

Figure 8:
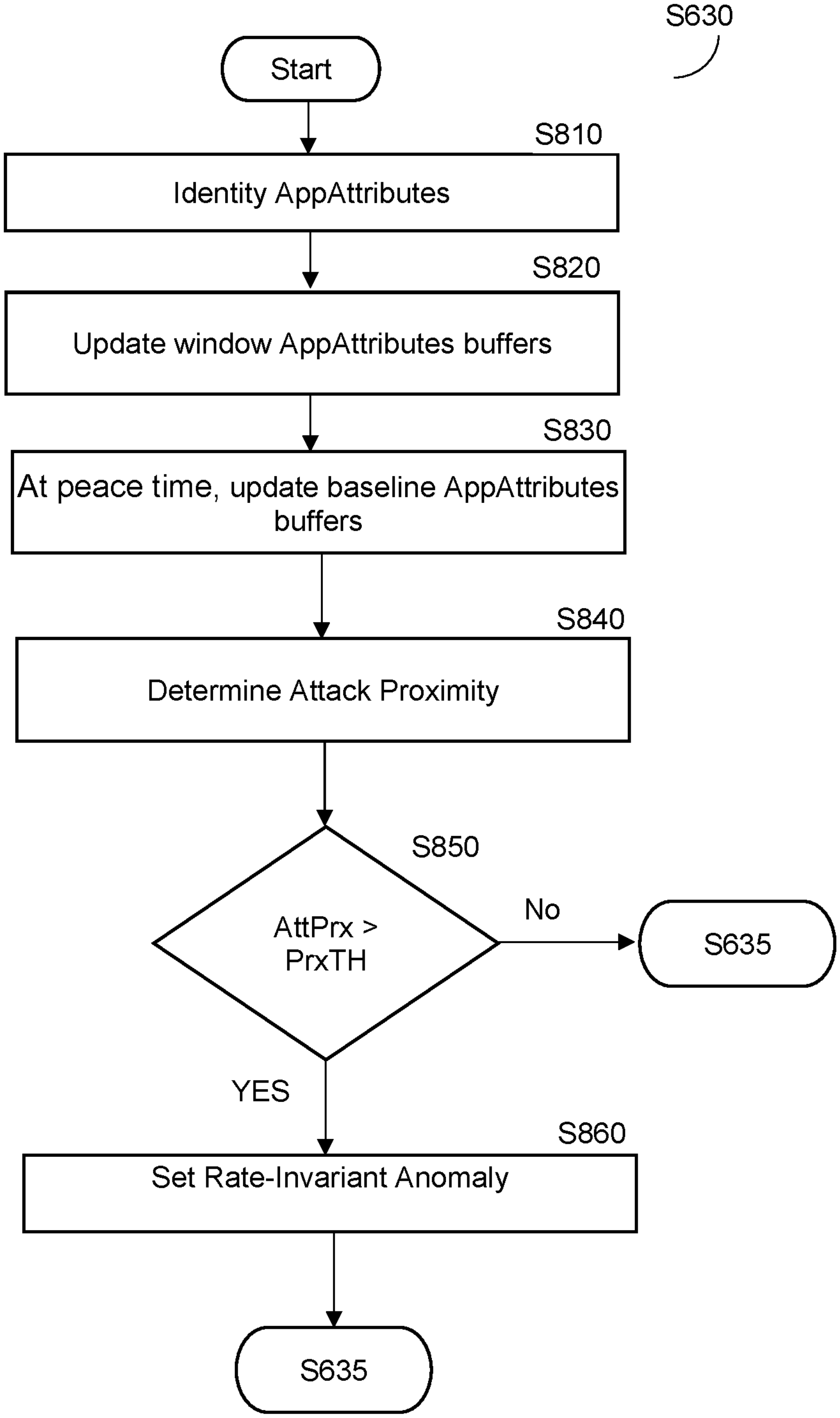
FIG. 8 is an example flowchart describing a method for detecting a rate-invariant anomaly according to an embodiment.

FIG. 8 shows an example flowchart S630 describing a method for detecting a rate-invariant anomaly according to an embodiment. The rate-invariant anomaly is determined based on AppAttributes.

At S810, transactions received during the current window are processed to at least identify AppAttributes in such transactions. The AppAttributes of various types, and for each AppAttributes type, at least a key is extracted or parsed out of the request.

At S820, window buffers for a current window are updated based on identified AppAttributes in the received transactions. This includes, for every previous AppAttributes key value, an occ field value, and weight field values that are incremented in the respective buffer. For the first occurrence of the AppAttributes key value, a new buffer is initiated, and the value is recorded therein. The new buffer for saving new occurrence values is dedicated. In both options, the weight and age fields are updated as mentioned above.

At S830, baseline buffers are updated based on window buffers. The update of the baseline buffers occurs only at peacetime, i.e., when an RPS normal indication is output. The update of the baseline is based on a simple addition or based on exponential averaging (e.g., by Alpha filter). The update of the baseline for newly seen AppAttributes occurs only when no anomaly is detected. The updated baseline buffers are discussed above.

At S840, an attack proximity is determined. The attack proximity indicates how statistically close the window buffers (for a current time window) are to baseline buffers. The attack proximity determination is discussed above.

At S850, the attack proximity is compared to the proximity threshold. If the attack proximity exceeds the proximity threshold, a rate-invariant anomaly is determined (S860). Either way, execution returns to S635 (FIG. 6).

Figure 9:
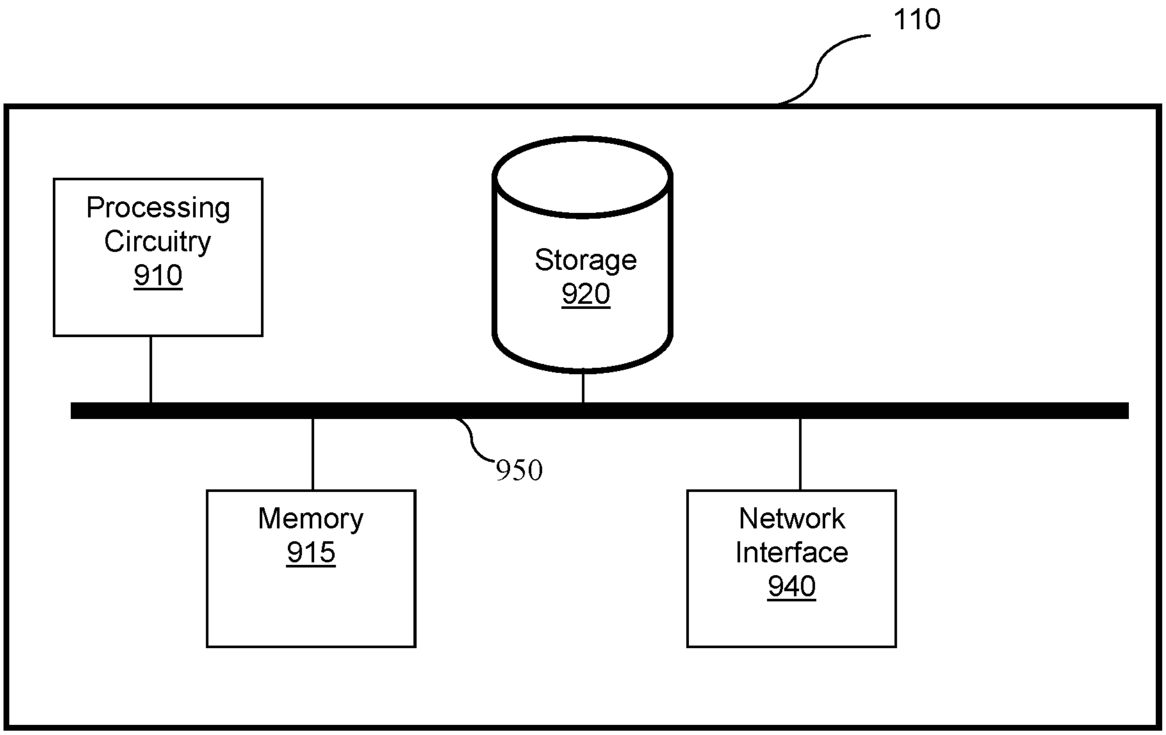
FIG. 9 is a block diagram of a device utilized to carry the disclosed embodiments.

FIG. 9 is an example block diagram of the system 110 implemented according to an embodiment. The detection system 110 includes a processing circuitry 910 coupled to a memory 915, a storage 920, and a network interface 940. In another embodiment, the components of system 110 may be communicatively connected via bus 950.

The processing circuitry 910 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 915 may be volatile (e.g., RAM, etc.), non-volatile (e.g., ROM, flash memory, etc.), or a combination thereof. In one configuration, computer-readable instructions to implement one or more embodiments disclosed herein may be stored in storage 920.

In another embodiment, the memory 915 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by one or more processors, cause the processing circuitry 910 to perform the various processes described herein. Specifically, the instructions, when executed, cause the processing circuitry 910 to perform the embodiments described herein. The memory 915 can be further configured to store the buffers.

The storage 920 may be magnetic storage, optical storage, and the like, and may be realized, for example, as flash memory or other memory technology, CD-ROM, Digital Versatile Disks (DVDs), or any other medium that can be used to store the desired information.

The processing circuitry 910 is configured to detect and cause detection of HTTPS flood attacks as described herein.

The network interface 940 allows the device to communicate at least with the servers and clients. It should be understood that the embodiments described herein are not limited to the specific architecture illustrated in FIG. 9, and other architectures may be equally used without departing from the scope of the disclosed embodiments. Further, the system 110 can be structured using the arrangement shown in FIG. 9

The various embodiments disclosed herein can be implemented as hardware, firmware, software, or any combination thereof. Moreover, the software is preferably implemented as an application program tangibly embodied on a program storage unit or computer-readable medium consisting of parts or of certain devices and/or a combination of devices. The application program may be uploaded to and executed by a machine comprising any suitable architecture. Preferably, the machine is implemented on a computer platform having hardware such as one or more central processing units (CPUs), memory, and input/output interfaces. The computer platform may also include an operating system and microinstruction code. The various processes and functions described herein may be either part of the microinstruction code or part of the application program or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone, B alone; C alone, 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

What is claimed is:

1. A method for detecting application layer flood denial-of-service (DDOS) attacks carried by attackers utilizing advanced application layer flood attack tools, comprising:

processing application-layer transactions received during a current time window to detect a rate-based anomaly in a traffic directed to a protected entity;

processing the received application-layer transactions to determine a rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent applicative behavior of the protected entity modeled based on the application-layer transactions;

determining, based on a detected rate-based anomaly and the determined rate-invariant anomaly, if an application layer flood DDOS is present in the current time window; and causing a mitigation action when the application layer flood DDOS is present.

2. The method of claim 1, wherein detecting the rate-based anomaly in a traffic directed to a protected entity further comprises:

computing a current rate-based parameter for the current time window as a number of incoming transactions per second received during the time window;

computing at least one rate-based baseline, each of the one rate-based baseline is computed using an alpha filter configured to a specific time period;

computing an anomaly rate-based threshold for each of at least one rate-based baseline; and decelerating rate-based anomaly when a value of the computed current rate-based parameter exceeds one of the anomaly rate-based threshold.

3. The method of claim 1, further comprising:

buffering, in window buffers, AppAttributes derived from application-layer transactions received during the current time window.

4. The method of claim 3, further comprising:

computing the baseline of AppAttributes using baseline buffers.

5. The method of claim 4, wherein each of the baseline buffers and the window buffers is for a single AppAttributes type.

6. The method of claim 5, wherein an AppAttributes type is any one of: a query arguments (args) name, a non-standard HTTP header name, a cookies name, a HTTP request size range, a HTTP response size range, a HTTP response status code, a source IP address attribute, a user agent values, a TLS figure print attribute, and a set-cookie name.

7. The method of claim 5, wherein each buffer of a single AppAttributes type includes: a key value field designating key value, an occurrence (occ) field counting occurrences, a weight field representing a relative weight, and an age field represents the last time the AppAttributes type observed in an incoming application-layer transaction.

8. The method of claim 3, wherein each AppAttributes type buffer of the window buffers includes a first segment including previous observed AppAttributes values and a second segment of first-time observed AppAttributes, wherein the first-time observed AppAttributes values are observed in transactions received during a current time window and are not designated in the first segment.

9. The method of claim 8, further comprising:

updating the window buffers based on AppAttributes values observed in transactions received during a current time window, wherein the window buffers are updated per each AppAttributes type.

10. The method of claim 9, further comprising:

at the end of current time window, updating the baseline buffers with AppAttributes in the respective window buffers, wherein the baseline buffers are updated at peace time only.

11. The method of claim 3, wherein determining the rate-invariant anomaly further comprises:

for each AppAttributes type, determining an attack proximity, wherein the attack proximity indicates how statistically close AppAttributes in the window buffers to AppAttributes in the baseline buffers;

computing a total attack proximity across all AppAttributes types based on their respective window buffers and baseline buffers;

computing a proximity threshold;

comparing the attack proximity to the proximity threshold; and declaring a rate-invariant anomaly when the attack proximity exceeds the proximity threshold.

12. The method of claim 11, further comprising: using a distribution density function to determine the attack proximity.

13. The method of claim 12, wherein the attack proximity for each AppAttribute type is a function of a total variation between a baseline distribution density and a window distribution density, wherein baseline distribution density function is determined based on the baseline buffers and the window determined based on the window buffers.

14. The method of claim 12, wherein the proximity threshold is a function of multiplication of a number of valid AppAttributes types with a preconfigured parameter.

15. The method of claim 1, wherein determining if the flood DDOS exits further comprises:

generating an alert on an attack when the rate-invariant and the rate-based anomaly indications are set during a time window.

16. The method of claim 2, further comprising:

determining an end-of-attack condition; and causing the mitigation action to end.

17. The method of claim 16, wherein determining the end-of-attack condition is satisfied when any one of the following conditions occurs:

the rate-invariant indication is below the respective rate-invariant threshold; or a rate-based indication is below one of the rate-based threshold.

18. The method of claim 1, wherein application-layer transactions include any one of: HTTP requests, HTTP responses, HTTPs requests, and HTTPs responses.

19. The method of claim 18, wherein application-layer transactions include samples of the actual HTTP requests, their corresponding HTTP responses and HTTPs requests, and their corresponding HTTPs responses, wherein a sampling rate can be different for peace time and attack time scenarios.

20. A non-transitory computer readable medium having stored thereon instructions for causing a processing circuitry to execute a process, the process comprising:

detecting application layer flood denial-of-service (DDOS) attacks carried by attackers utilizing advanced application layer flood attack tools, comprising:

processing application-layer transactions received during a current time window to detect a rate-based anomaly in a traffic directed to a protected entity;

processing the received application-layer transactions to determine a rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent applicative behavior of the protected entity modeled based on the application-layer transactions;

determining based on a detected rate-based anomaly and the determined rate-invariant anomaly if an application layer flood DDOS is present in the current time window; and causing a mitigation action when the application layer flood DDOS is present.

21. A system for detecting application layer flood denial-of-service (DDOS) attacks carried by attackers utilizing advanced application layer flood attack tools, comprising:

a processing circuitry; and a memory, the memory containing instructions that, when executed by the processing circuitry, configure the processing circuitry to:

process application-layer transactions received during a current time window to detect a rate-based anomaly in a traffic directed to a protected entity;

process the received application-layer transactions to determine a rate-invariant anomaly based on a plurality of Application Attributes (AppAttributes) observed in the application-layer transactions received during the current time window, wherein the rate-invariant anomaly is determined based on a continuously updated baseline of AppAttributes, wherein AppAttributes represent applicative behavior of the protected entity modeled based on the application-layer transactions;

determine, based on a detected rate-based anomaly and the determined rate-invariant anomaly, if an application layer flood DDOS is present in the current time window; and cause a mitigation action when the application layer flood DDOS is present.

22. The system of claim 21, wherein the system is further configured to:

compute a current rate-based parameter for the current time window as a number of incoming transactions per second received during the time window;

compute at least one rate-based baseline, each of the one rate-based baseline is computed using an alpha filter configured to a specific time period;

compute an anomaly rate-based threshold for each of at least one rate-based baseline; and decelerate rate-based anomaly when a value of the computed current rate-based parameter exceeds one of the anomaly rate-based threshold.

23. The system of claim 21, wherein the system is further configured to:

buffer, in window buffers, AppAttributes derived from application-layer transactions received during the current time window.

24. The system of claim 23, wherein the system is further configured to:

compute the baseline of AppAttributes using baseline buffers.

25. The system of claim 24, wherein each buffer of the baseline buffers and the window buffers is for a single AppAttributes type.

26. The system of claim 25, wherein an AppAttributes type is any one of: a query arguments (args) name, a non-standard HTTP header name, a cookies name, a HTTP request size range, a HTTP response size range, a HTTP response status code, a source IP address attribute, a user agent values, a TLS figure print attribute, and a set-cookie name.

27. The system of claim 25, wherein each buffer of a single AppAttributes type includes: a key value field designating key value, an occurrence (occ) field counting occurrences, a weight field representing a relative weight, and an age field represents the last time the AppAttributes type observed in an incoming application-layer transaction.

28. The system of claim 23, wherein each AppAttributes type buffer of the window buffers includes a first segment including previous observed AppAttributes values and a second segment of first-time observed AppAttributes, wherein the first-time observed AppAttributes values are observed in transactions received during a current time window and are not designated in the first segment.

29. The system of claim 28, wherein the system is further configured to:

update the window buffers based on AppAttributes values observed in transactions received during a current time window, wherein the window buffers are updated per each AppAttributes type.

30. The system of claim 29, wherein the system is further configured to:

at the end of current time window, update the baseline buffers with AppAttributes in the respective window buffers, wherein the baseline buffers are updated at peace time only.

31. The system of claim 23, wherein the system is further configured to:

for each AppAttributes type, determining an attack proximity, wherein the attack proximity indicates how statistically close AppAttributes in the window buffers to AppAttributes in the baseline buffers;

computing a total attack proximity across all AppAttributes types based on their respective window buffers and baseline buffers;

computing a proximity threshold;

comparing the attack proximity to the proximity threshold; and declaring a rate-invariant anomaly when the attack proximity exceeds the proximity threshold.

32. The system of claim 31, wherein the system is further configured to: use a distribution density function to determine the attack proximity.

33. The system of claim 32, wherein the attack proximity for each AppAttribute type is a function of a total variation between a baseline distribution density and a window distribution density, wherein baseline distribution density function is determined based on the baseline buffers and the window determined based on the window buffers.

34. The system of claim 32, wherein the proximity threshold is a function of multiplication of a number of valid AppAttributes types with a preconfigured parameter.

35. The system of claim 21, wherein the system is further configured to:

generate an alert on an attack when the rate-invariant and the rate-based anomaly indications are set during a time window.

36. The system of claim 22, wherein the system is further configured to:

determine an end-of-attack condition; and cause the mitigation action to end.

37. The system of claim 36, wherein the system is further configured to determine the end-of-attack condition is satisfied when any one of the following conditions occurs:

the rate-invariant indication is below the respective rate-invariant threshold; or a rate-based indication is below one of the rate-based threshold.

38. The system of claim 21, wherein application-layer transactions include any one of: HTTP requests, HTTP responses, HTTPs requests, and HTTPs responses.

39. The system of claim 38, wherein application-layer transactions include samples of the actual HTTP requests, their corresponding HTTP responses and HTTPs requests, and their corresponding HTTPs responses, wherein a sampling rate can be different for peace time and attack time scenarios.

* * * * *